United States Patent
Mattila

[11] Patent Number: 5,953,665
[45] Date of Patent: Sep. 14, 1999

[54] METHOD AND APPARATUS FOR DIGITAL CONTROL CHANNEL (DCCH) SCANNING AND SELECTION IN A CELLULAR TELECOMMUNICATIONS NETWORK

[75] Inventor: Ilpo Mattila, Ruukki, Finland

[73] Assignee: Nokia Mobile Phones Limited, Salo, Finland

[21] Appl. No.: 08/773,143

[22] Filed: Dec. 26, 1996

[51] Int. Cl.[6] .................................................. H04Q 7/22
[52] U.S. Cl. .................. 455/434; 455/435; 455/450; 455/451; 455/452; 455/455; 370/329; 370/348; 370/336; 370/337; 370/524
[58] Field of Search ................................ 455/434, 435, 455/450, 451, 452, 455; 370/329, 348, 336, 337, 524

[56] References Cited

U.S. PATENT DOCUMENTS

| | | | |
|---|---|---|---|
| 5,212,803 | 5/1993 | Uddenfeldt et al. | 445/33.1 |
| 5,353,332 | 10/1994 | Raith et al. | 379/59 |
| 5,541,978 | 7/1996 | Brunner et al. | 379/60 |
| 5,570,467 | 10/1996 | Sawyer | 455/33.1 |
| 5,574,996 | 11/1996 | Raith | 455/161.3 |
| 5,640,677 | 6/1997 | Karlsson | 455/33.2 |
| 5,722,078 | 2/1998 | Przelomiec | 455/452 |
| 5,768,267 | 6/1998 | Raith et al. | 370/329 |
| 5,778,316 | 7/1998 | Persson et al. | 455/434 |

*Primary Examiner*—Wellington Chin
*Assistant Examiner*—Isaak R. Jama
*Attorney, Agent, or Firm*—Brian T. Rivers

[57] ABSTRACT

A method for selecting a digital control channel (DCCH) for a mobile station operating in a cellular system. In the method, after a first DCCH meeting rssi requirements has been located, a search is made for a more preferable second DCCH before camping on the first DCCH. If a more preferred second DCCH is found, the mobile station then camps on the second DCCH. The method includes the process of performing a quick reselection on available digital control channels(DCCH) at points in the selection process, when a first DCCH that meets received signal strength (rssi) criteria at the mobile station has been located using a conventional process, but a more preferable second DCCH could possibly still be found. In an embodiment of the invention the quick reselection may be performed on DCCHs included in a neighbor cell list received on the first DCCH.

18 Claims, 3 Drawing Sheets

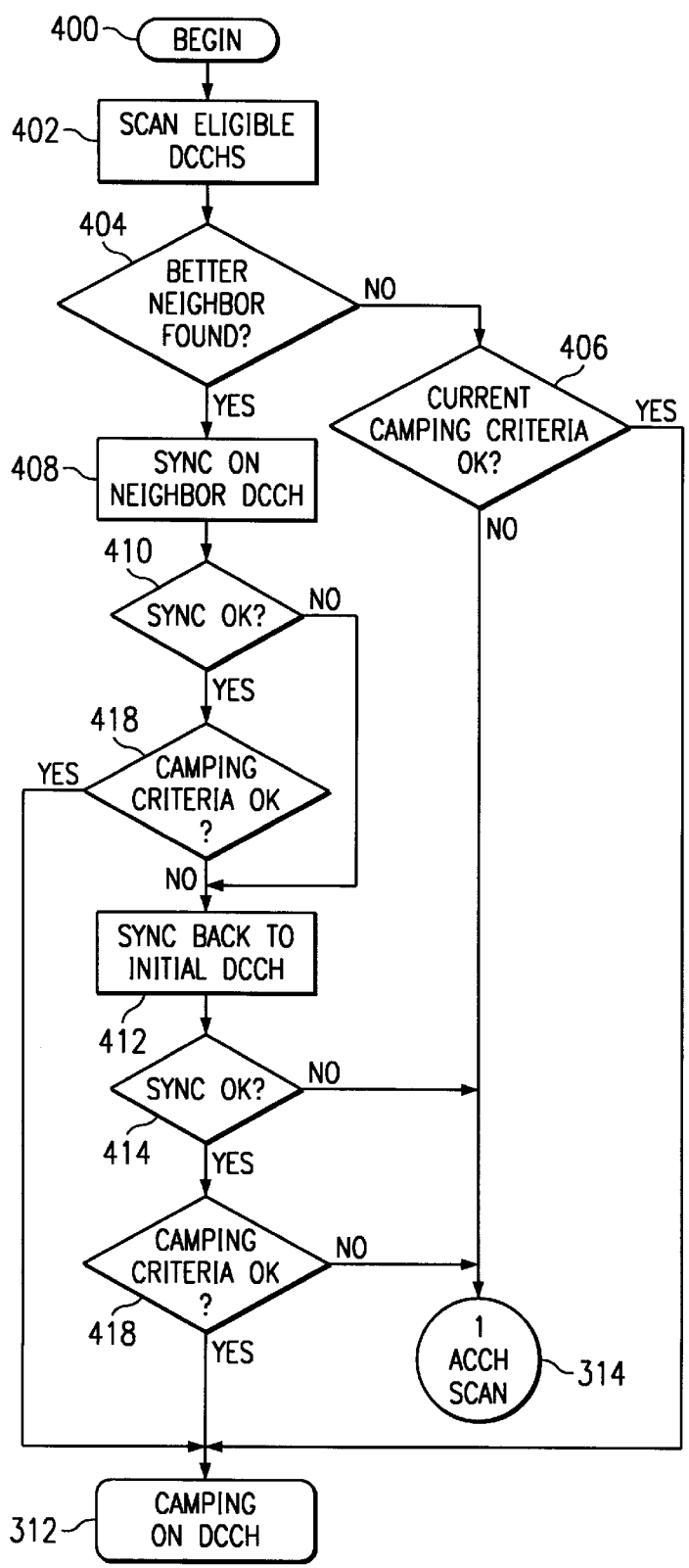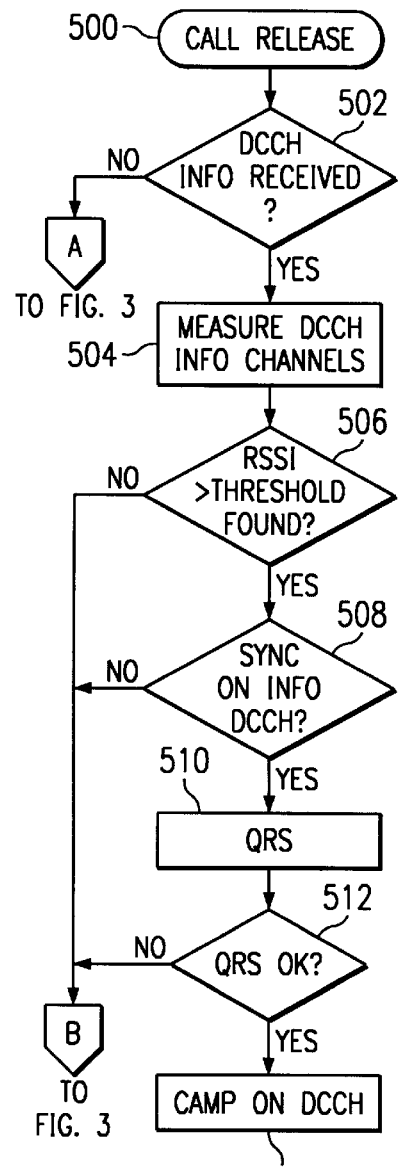
FIG. 4
FIG. 5

METHOD AND APPARATUS FOR DIGITAL CONTROL CHANNEL (DCCH) SCANNING AND SELECTION IN A CELLULAR TELECOMMUNICATIONS NETWORK

FIELD OF THE INVENTION

This invention relates generally to cellular telecommunications networks and, more particularly, to an improved method and apparatus for selecting a digital control channel (DCCH) for a mobile station in a digital cellular telecommunications network.

BACKGROUND OF THE INVENTION

In a cellular telecommunications network, the geographical area covered by the network is divided into cells, with groups of one or more cells defining a service area of the network. Each of the cells contains a base station that transmits and receives control information and voice communications to and from mobile stations that are located in the coverage area of the cell. Typically, each of the cells uses a separate control channel for exchanging control information with a mobile station, and a set of choice channels for exchanging voice or data signals (traffic signals) with a mobile station. The type of control channel used in a particular system depends on the system standard. The most popular current cellular networks employ either an analog control channel (ACCH) or digital control channel (DCCH), or both an analog control channel (ACCH) and a digital control channel (DCCH).

The term ACCH was created to describe a control channel originally developed for use in a system having analog voice channels, although now an ACCH may also be used in a dual mode analog/digital system for control of digital traffic channels. Each ACCH of a system is typically assigned to a set frequency channel. An example of a network using an ACCH would be a network that operates according to the Telecommunications Industry Association/Electronic Industries Association(TIA)/(EIA) 553 analog system standard (AMPS). In AMPS approximately 21 of the 832 available frequency channels are defined for use as ACCHs.

The term DCCH is commonly used to describe a control channel used in a time division multiple access (TDMA) digital cellular system. In a TDMA system, each channel which is broadcasting at a particular frequency is divided into a plurality of time slots. Subscriber communications or control channel signals are converted to digital format and divided into short communications bursts. Each burst is tagged with an identifier, assigned a time slot, and is broadcast in an interleaved fashion with other bursts on the same frequency. At the receiving end, the identifiers are used to reconstruct the entire communication from the individual bursts. An example of a system using a DCCH would be a network operating according to the TIA/EIA IS-136 dual mode standard.

In a cellular system, a control channel must always be available for each mobile station operating within the system. This is necessary so the mobile station always has access to the control information needed to make and receive calls and to operate correctly in the system. When a mobile station is powered on at an arbitrary location within a cell of the system, the mobile station must initially locate and select a suitable control channel. As the mobile station then roams about the coverage area of the cellular system, it must be able to locate and tune to a control channel of the cells into which it roams. Control channel selection while roaming is typically performed by making measurements on control channels identified in a "neighbor cell list". The neighbor cell list, which identifies the control channels of neighboring cells, is transmit on the control channel of each cell at certain predetermined intervals. As the mobile station roams, it measures each neighbor cell control channel in the list at predetermined times, and tunes to one of the neighbor cell list control channels when the signal strength of the signal received on that control channel becomes greater than the signal strength received from the current control channel. Since the configuration of the cellular system is known, determining the correct control channels for a particular cell's neighbor cell list is a relatively straightforward task.

If a mobile station does not have, or has limited or outdated information on the identity of the nearest control channels, the process of locating a suitable control channel may present problems that do not occur when a mobile station has accurate identifying information available on known neighbor cell control channels. For example, power up of a mobile station may take place arbitrarily within any cell of the system, so initial control channel selection can also arbitrarily take place within any cell of the system. In the case of initial control channel selection, the mobile station must be capable of selecting a suitable control channel that could be one of any of the whole set of control channels in the system.

The use of DCCHs in a cellular system presents some problems in the control channel reselection process that do not commonly occur when only ACCHs are used. Since an ACCH is typically assigned to a fixed frequency in a cellular network, the frequency channels can be known at the mobile station. In an AMPS network, for example, at least one of these 21 frequency channels assigned as control channels in the AMPS standard is used in each base station of the network. It is a relatively simple task for the mobile station to scan and measure the 21 frequencies at certain times, during power up for example, to determine the control channel with the strongest received signal strength at the mobile station and to then tune to that frequency channel. That control channel would normally be the ACCH of the cell in which the mobile station is located. The mobile station does not need to know the control channel of the cell in which it was located, or the neighbor cell list of that cell, before power up in order to quickly locate a control channel. DCCHs on the other hand are defined as a certain timeslot or set of timeslots on a frequency channel in a TDMA system and, for flexibility, it is common to allow assignment of a DCCH to any one of a large number of frequency channels, possibly the whole range of frequency channels available to the base stations in the network. For example, in an IS-136 system the DCCHs assigned to the various base stations could be on any network frequency channel in the first and fourth timeslots. During control channel selection a mobile station may have to scan the whole range of frequencies in order to locate and select a DCCH. This process could take a considerble period of time.

Different techniques have been developed for DCCH selection in situations such as power up. Several solutions are included in the reference model process described in the IS-136 standard (IS-136.1-A, appendix D). In this process a mobile station initially tunes to the last used DCCH, or tunes to a strongest DCCH chosen from a number of last used DCCHs. The mobile then synchronizes to the DCCH and determines if the signal strength and service criteria are satisfied on that DCCH. If the criteria are satisfied, the mobile station then tunes to and camps on the DCCH. When camped on the DCCH the mobile station may receive messages from the system or access the system on the DCCH. If the signal strength and service criteria are not satisfied, the mobile station repeats the process on the next strongest last used DCCH, if more than one DCCH identifier is stored. If an acceptable last used DCCH cannot be found, the mobile station initiates a scan of the ACCHs of the system and tunes to the best acceptable ACCH that is found. If an ACCH is found, the mobile station searches for a DCCH pointer in the control channel information message of the ACCH. If a DCCH pointer is found the mobile station performs the IS-136 control channel selection procedure. If no DCCH pointer is found on the ACCH, or if the DCCH pointed to does not meet the control channel selection procedure criteria, the mobile station registers on the ACCH. If the mobile station is unable to find a ACCH, it performs a band scan of the entire system band. The mobile station then finds the strongest RF channel in the band. If the strongest RF channel includes a DCCH, the mobile station performs the IS-136 control channel and selection procedure and camps on the DCCH if the selection criteria are satisfied. If a DCCH is found but the selection criteria are not satisfied on the RF channel having the strongest rssi at the mobile station, the mobile station receives a neighbor cell list from the DCCH and attempts to locate an acceptable neighbor DCCH for camping. If a DCCH is not found on the current RF channel, the mobile station will look for a digital traffic channel (DTC) on the current RF channel carrying a coded digital control channel locator (CDL) information. If CDL information is found, the mobile station attempts to find a DCCH that meets reselection criteria from the CDL information, starting with the strongest DCCH. If need be, the mobile station will check all DCCHs identified in the CDL. If no DCCH is located from the strongest RF channel, the mobile station selects the next strongest RF channel and repeats the process for each RF channel, continuing until all channels of suitable signal strength have been evaluated. If no DCCH is found from the RF channel search, the mobile station will perform a search on an alternate system band, or start the process again.

There are several situations in which the IS-136 reference model process may not provide the best control channel search capability in a cellular system. One situation is when a "distant DCCH problem" occurs. A second situation is when a "single DCCH pointer problem" occurs in a cellular system that utilizes sectored cell sites.

Referring now to FIG. 1, therein is illustrated the configuration of a conventional cellular system 100 having a simulcast sectored cellsite configuration. In FIG. 1, an arbitrary geographic area be divided into a plurality of contiguous radio coverage areas C1-C10 defined by the hexagonal areas bordered by solid lines. Each cell C1-C10 includes a cell site base station B1-B10, respectively, that provides system coverage to mobile stations within the coverage area of the cell. Each of the cells C1-C10 is allocated a plurality of voice or speech channels and at least one access or control channel. Each cell site C1-C10 is shown divided into three subareas or sectors a,b,c, defined by the dotted lines radiating outward from each base station B1-B10, respectively. Although not shown, each of the base stations B1-B10 may be connected to a mobile switching center (MSC) through conventional cellular system connections. The MSC may in turn be connected to the public switched telephone network (PSTN) to allow calls to and from the PSTN. The sectors a,b,c of each cell C1-C10 each represent the area covered by one of three sectorized antennas of each base station B1-B10, respectively, that transmit control information on a DCCH. Each base station B1-B10 also include an omindirectional antenna that transmits control information on an ACCH throughout the entire area of each cell C1-C10, respectively. A mobile station operating in system 100 is capable of making and receiving calls over an air interface through one or more of base stations B1-B10 as it moves throughout the coverage area of each of cells C1-C10. The DCCH is preferred for use, and as a mobile station moves throughout system 100 the mobile station will attempt to locate a DCCH as was described previously. For explanative purposes, only the base station equipment of cellular system in 100 is shown FIG. 1.

The distant DCCH problem that occurs in a system operating according to the IS-136 reference model may occur in cellular system 100 when a mobile station is powered down in one cell of the system, and is then moved and powered up in a cell distant from the cell in which it was powered down. For example, if a mobile station has been active in cell C7, is powered down within sector a of cell C7, and is then moved into sector a of cell C6, the mobile station will begin using the last used DCCH list to attempt to locate a DCCH. If the DCCH from B7 controlling sector a of cell C7 is located and meets the minimum IS-136 strength and service aspects selection criteria, because of unusual RF propagation effects or otherwise, the mobile station will camp on that DCCH, even though the signal may be relatively weak as compared to other potential DCCHs. A DCCH of cell C6 would actually be preferred, most likely the DCCH controlling sector a of cell C6. While reselection using the neighbor cell list received from the camped on DCCH may eventually lead to a better DCCH, the mobile station may spend a relatively long time, possibly measured in seconds, camped on the DCCH of B7 controlling sector a. If a call is made or received during the time in which the mobile station is camped on the DCCH of B7 controlling sector a of cell C7, the call will be assigned a voice channel of cell C7 and might not be setup, or might be dropped, because of poor signal strength or a low carrier to interference (C/I) ratio, or the call might have to be handed off immediately.

The single DCCH pointer problem that occurs in a sectorized system operating according to the IS-136 reference model may also occur in cellular system 100. This may occur during any time in the IS-136 reference model process when a mobile station reads a DCCH pointer from an ACCH, locates a DCCH, and camps on that DCCH after determining if the DCCH meets the IS-136 strength and service aspects selection criteria. Because each sectorized cell uses three DCCHs, one for each sector, and there is only provision for one DCCH pointer on the ACCH, it may turn out that the DCCH is not the optimum choice for the mobile station. For example, if a mobile station is powered on in sector a of cell C4, initially finds no DCCH, and gets to the point in the selection process where it reads a DCCH pointer from the ACCH of cell C4, a DCCH pointer to the DCCH for sector c. Since the DCCH for sector c is radiated away from sector a, the signal strength may be relatively weak. However, it is possible that the mobile station may camp on that DCCH. Problems similar to those in the distant DCCH scenario could then occur. The pointer problem could also occur upon termination of a call between the mobile station and a base station. In the situation in which the mobile receives a call release message over a voice channel, including DCCH identifying information, it may be that a DCCH is available to the mobile station that is more preferred than the DCCH or DCCHs identified in the call release message. One situation in which this could occur would be if a mobile station released a call while moving quickly, such as by automobile, out of a first cell into a second cell and received the DCCH information from the voice or traffic channel of the first cell.

In the problem situations described above, it is possible that a second DCCH that would be more preferred for camping on then the DCCH that was actually camped on is available for use by the mobile station. For example, in the single DCCH pointer problem scenario it is obvious that the DCCH controlling sector a of cell C4 is the preferred DCCH for camping. In the distant DCCH problem scenario, a DCCH of cell C6 would probably be most preferred.

As may be appreciated from the above, it would be desirable to provide an improved method for efficient and quick DCCH selection in a cellular system, wherein the method is not significantly time consuming as compared to other methods but where the method minimizes the possibility that a first digital control channel is selected for a mobile station in a cellular system, when a more preferable second digital control channel is available for selection for the mobile station.

OBJECTS OF THE INVENTION

It is thus a first object of this invention to provide an improved method and apparatus for selecting a digital control channel for mobile station operation in a cellular system.

It is a second object of this invention to provide a method and apparatus that minimizes the possibility that a first digital control channel is selected for a mobile station in a cellular system and is camped on by the mobile station, when a more preferable second digital control channel is available for selection and camping on by the mobile station.

SUMMARY OF THE INVENTION

The foregoing problems are overcome and the objects of the invention are realized by methods and apparatus in accordance with embodiments of this invention. A method of this invention is disclosed for selecting a digital control channel (DCCH) for a mobile station operating in a cellular system. In the method, after a first DCCH meeting rssi requirements has been located, a search is made for a more preferable second DCCH before camping on the first DCCH. If a more preferred second DCCH is found, the mobile station then camps on the second DCCH. Finding a more preferred second DCCH improves the control channel selection process and prevents problems that may occur for example, when a mobile station has been powered on within the coverage area of a cell distant from the cell in which the mobile station was powered down, or when a mobile station has received digital control channel identifying information on an analog control channel in a simulcast sectored cell having at least one digital control channel for each cell.

In an embodiment of the invention, the method of selecting a DCCH includes the process of performing a quick reselection (QRS) on available digital control channels (DCCH) at points in the selection process, when a first DCCH that meets received signal strength (rssi) criteria at the mobile station has been located using a conventional process, but a more preferable second DCCH could possibly still be found. The quick reselection occurs after the mobile station has synchronized to the first DCCH. After synchronization to the first DCCH, the neighbor cell list of the located DCCH is read at the mobile station. Next, instead of an evaluation as to whether or not the first DCCH meets system service criteria being performed, and the mobile station camping on the first DCCH if the service criteria are met, measurements are performed at the mobile station on the DCCHs included in the neighbor cell list received on the first DCCH. It is then determined whether the neighbor cell list contains a more preferred second DCCH. If a more preferred second DCCH is found that meets camping criteria, the mobile station camps on the second DCCH. The quick reselection process includes performing quick measurements on DCCHs in the neighbor cell list received on the located DCCH, and determining if one of the DCCHs in the neighbor cell list is more preferred for camping on then the located DCCH. The determination as to whether a second DCCH is more preferred than the first DCCH may be based on criteria such as rssi, neighbor cell type (micro, macro), etc. The quick measurements are performed on candidates chosen from the neighbor cell list. The candidates are chosen according to criteria that accounts for the fact that it is desired to perform quick reselection as rapidly as possible immediately after the mobile station has read the neighbor cell list from the first DCCH and before camping on the first DCCH. For example, it may not be required that rssi measurements meet a certain criteria, for example be above a certain level over a certain time period, in order for a DCCH to be chosen as a candidate.

In the preferred embodiment, the selection process may include performing quick reselection in an initial DCCH selection process after locating a first DCCH with acceptable rssi from an initial scan of DCCHs, or after locating a first DCCH with an acceptable rssi from a pointer transmitted on an analog control channel(ACCH). Quick reselection may also be performed upon call release when a DCCH with acceptable rssi is located from a pointer of an ACCH or from DCCH location information received upon release from a voice or traffic channel.

DETAILED DESCRIPTION OF THE DRAWINGS

FIG. 4 is a flow diagram illustrating process steps for a quick reselection process performed in step 308 of FIG. 3; and FIG. 5 is a flow diagram illustrating control channel process steps performed within a mobile station upon call release according to an embodiment of the invention.

DETAILED DESCRIPTION OF THE INVENTIONS

Figure 1:
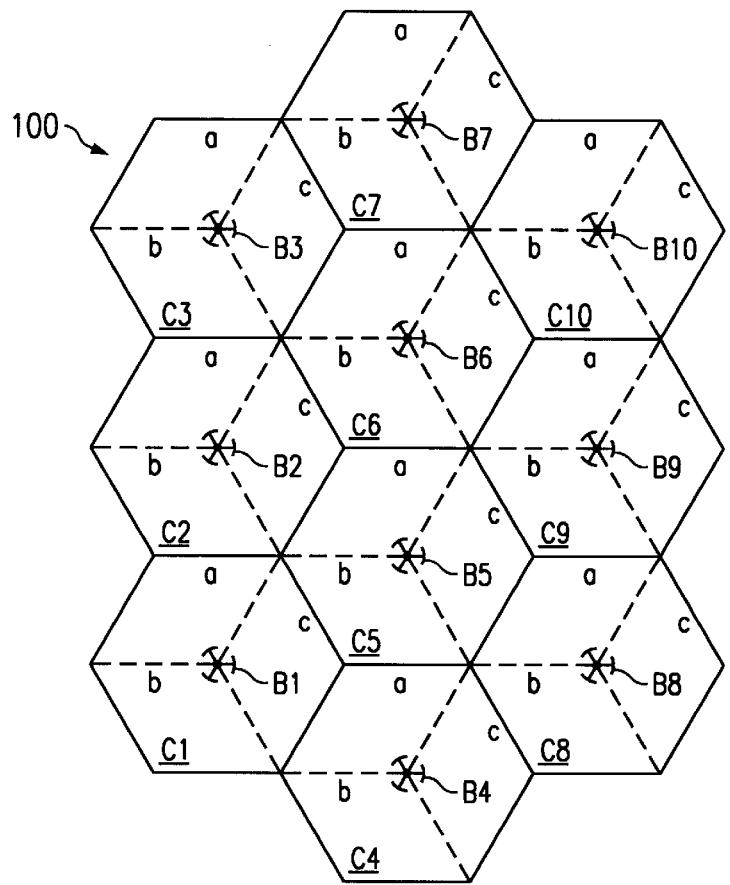
FIG. 1 illustrates a conventional cellular system having simulcast sectorized cellsite configuration.
Figure 2:
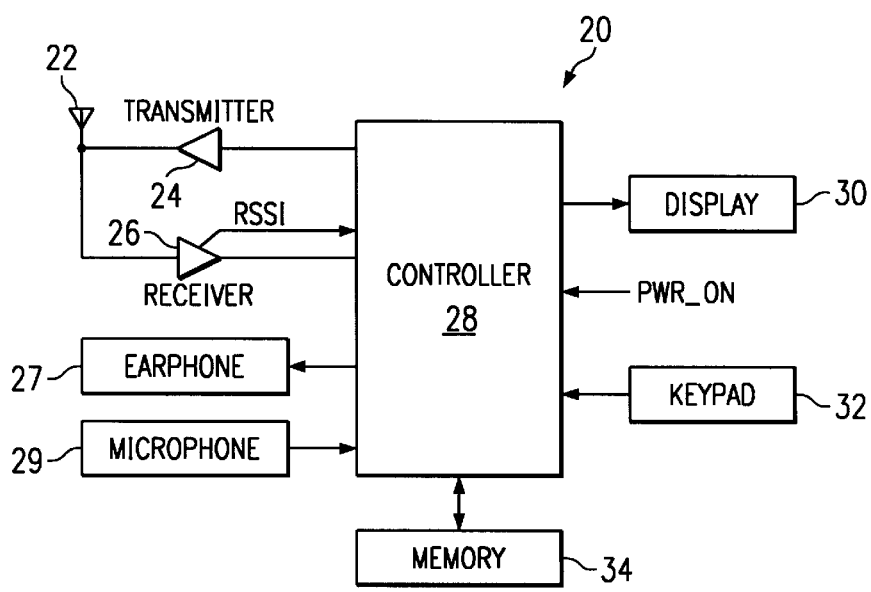
FIG. 2 is a block diagram of a mobile station that is constructed and operated in accordance with this invention.

Referring now to FIG. 2, therein is a block diagram of a mobile station that is constructed and operated in accordance with this invention. Mobile station 20 includes an antenna 22 for transmitting signals to and receiving signals from a base station, such as base stations B1-B10 of cellular system 100 of FIG. 1. Mobile station 20 includes a transmitter 24, a receiver 26, and a controller 28. Controller 28 provides control signals to transmitter 24 and receiver 26, and also receives signals from receiver 26 and inputs signals to transmitter 24 for transmission to the network. These signals include signaling information in accordance with the air interface of the 30 cellular system and/or user generated voice or data. The controller 28 inputs a received signal strength indicator (rssi) from the receiver 26, and employs the rssi as will be described below.

A user interface includes a conventional earphone 27, a conventional microphone 29, a display 30, and a user input device, typically a keypad 32, each of which is coupled to controller 28. Mobile station 20 also includes various memories, shown collectively as memory 34, wherein are stored a plurality of constants and variables that are used by the controller 28 during the operation of mobile station 20. For example, memory 34 stores the values of various cellular system parameters and the number assignment module (NAM). An operating program for controlling the operation of controller 28 is also stored in memory 34 (typically in a ROM device). Memory 34 also stores data, including messages that are received from a cellular network prior to processing of the messages by controller 28.

It should be understood that mobile station 20 can be capable of operating with one or more air interface standards, modulation types, and access types. By example, mobile station 20 may be capable of operating in accordance with the EA/TIA IS-136 dual mode standard, in which the frequency modulated (FM), frequency division multiple access (FDMA) transmission and reception of EIA/TIA-553 (AMPS) is used for analog mode and, the time division multiple access (TDMA) transmission and reception of IS-136 is used for digital mode. Mobile station 20 may also be capable of operating with any of a number of other multi mode analog/digital or, single mode digital standards that utilize a digital control channel, such as GSM or GSM based PCS1900. In general, the teaching of this invention applies to any mobile station that operates within a cellular system having DCCHs, where the DCCHs may be assigned to at least one of a plurality of timeslots on one of a plurality of frequency channels of the cellular system. It should thus be clear that the teaching of this invention is not to be construed to be limited to any one particular type of mobile station or air interface standard.

In general, the operating program in memory 34 includes routines for selecting a DCCH for operation of mobile station 20 in a cellular system such as cellular system 100 of FIG. 1. In a preferred embodiment the memory 34 include routines for implementing the methods described below in relation to FIGS. 3, 4, and 5.

Figure 3:
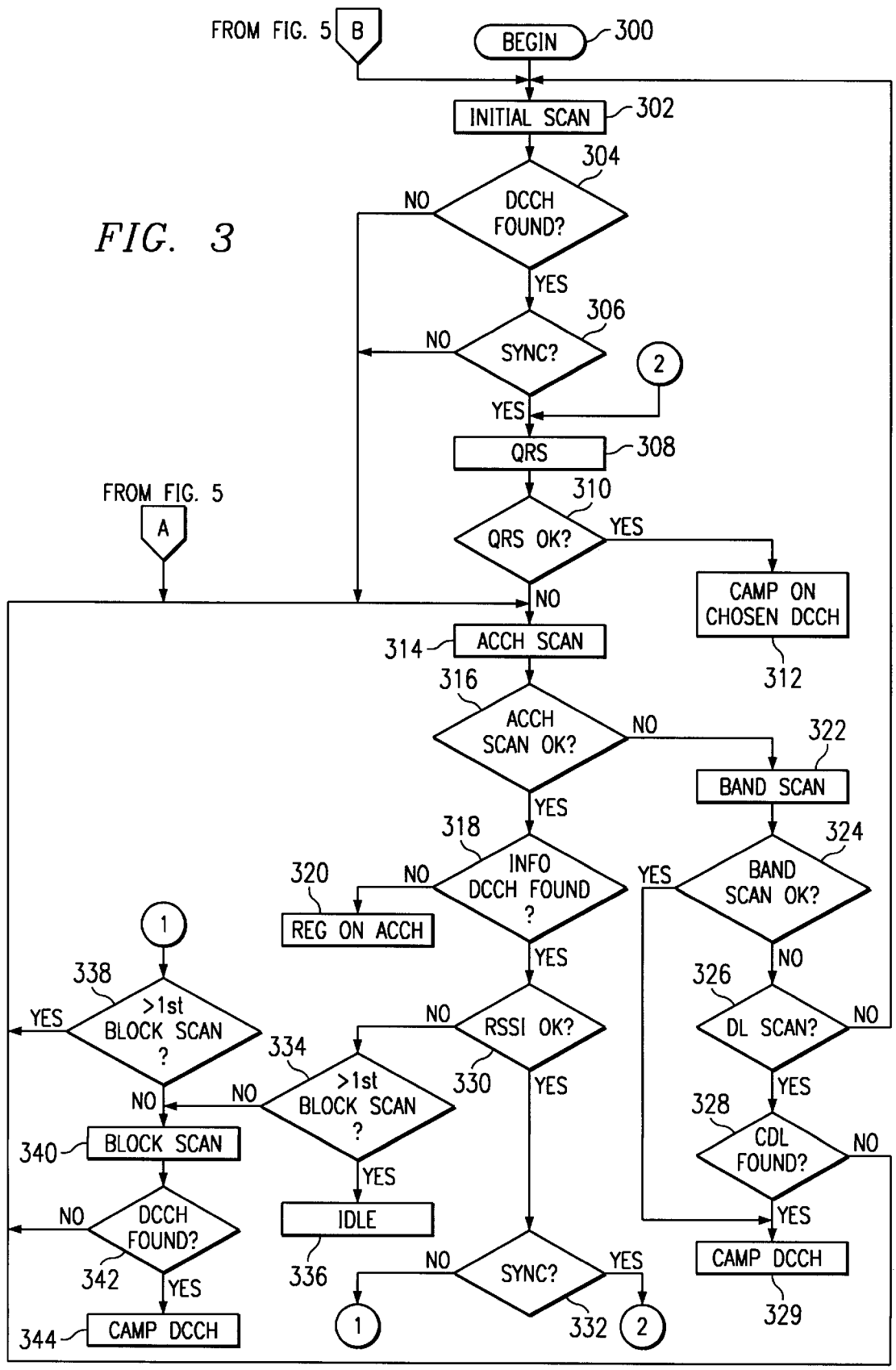
FIG. 3 is a flow diagram illustrating control channel selection process steps performed by a mobile station according to an embodiment of the invention.

Referring now to FIG. 3, therein is a flow diagram illustrating control channel selection process steps performed within a mobile station operating according to an embodiment of the invention. The embodiment of FIG. 3 is particularly suited for implementation in a dual mode analog/digital cellular system having both ACCHs and DCCHs, such as one that operates according to the EIA/TIA IS-136 standard. FIG. 3 may be explained using the example in which mobile station 20 operates according to the embodiment of FIG. 2 in cellular system 100 of FIG. 1. The process begins at step 300 when mobile station 20 is powered up within cellular system 100. Next, at step 302, an initial scan is performed to locate a initial DCCH. The initial scan of step 302 may be performed using one of several alternatives techniques. In one alternative, the last used DCCHs list may be used to determine the DCCHs that will be scanned, with the DCCH in the list having the strongest rssi that meets minimum system DCCH selection rssi requirements at mobile station 20 being chosen as an initial DCCH. If there are no DCCHs in the list, or if no DCCH is found that meets the minimum system DCCH selection rssi requirements, no initial DCCH is chosen. In a second alternative, the ACCHs of cellular system 100 may also be scanned in addition to the last used DCCH list. In this second alternative, if the rssi of the DCCH having the strongest rssi of DCCHs in the last used list is a predetermined amount above the rssi of the strongest received ACCH, the DCCH having the strongest rssi of DCCHs in the last used list will be chosen as an initial DCCH. If there are no DCCHs in the list, if no DCCH is found that meets the minimum rssi requirements or, if no DCCH is found having the an rssi a predetermined amount above the rssi of the strongest received ACCH, no initial DCCH is chosen.

After the initial scan of step 302 is performed the process moves to step 304. At step 304 it is determined if an initial DCCH was found in the initial scan. If an initial DCCH was found in the initial scan, the process moves to step 306. At step 306 mobile station 20 attempts to synchronize to the initial DCCH. If mobile station 20 synchronizes to the initial DCCH, mobile station 20 reads control channel information from the initial DCCH, including a neighbor cell list, and moves to step 308 of the process.

At step 308, and in accordance with the teaching of this invention, a quick reselection (QRS) is performed to determined if a second DCCH, more preferred for mobile station 20, is included in the neighbor cell list read from the initial DCCH or if the initial DCCH is the best. Next, at step 310, it is determined if the quick reselection process has found a DCCH. If a second DCCH is found, or if it is determined in step 308 that the initial DCCH is to be used, the process moves to step 312 where mobile station 20 camps on the chosen DCCH. If, however, a second DCCH is not found and the initial DCCH is found not to be acceptable in step 308, the process moves to step 314.

Referring now to FIG. 4, therein is a flow diagram illustrating detailed process steps for a quick reselection process performed in step 308 of FIG. 3, according to an embodiment of the invention. Steps 312 and 314 of FIG. 4 are the same steps as steps 312 and 314 of FIG. 3. The process begins at step 400 when step 308 is reached in FIG. 3. Next, at step 402, DCCHs are scanned in the neighbor cell list received from the initial DCCH to which synchronization is achieved in step 306. Depending on the standard of the system in to which the embodiment is implemented, the scanning may be implemented by utilizing and modifying existing system measurement and periodic reselection algorithms that are used for measurement and periodic reselection after camping on a DCCH. For example, in an IS-136 embodiment, because mobile station 20 has achieved synchronization to the initial DCCH only a relatively short time period earlier (much less then the time period necessary for a periodic reselection to be initiated), the quick reselection of the embodiment of FIG. 3 could use a modified IS-136 candidate eligibility selection process for determining eligibility of neighbor cell list DCCHs for measurement during periodic reselection by ignoring any required time period that a DCCH's rssi must be above a certain level before it can be considered a candidate in the algorithm. Also, since the mobile station is not yet camped on the first DCCH, the algorithm could ignore thresholds used to prevent ping ponging (jumping back and forth from DCCH to DCCH). An example of a threshold such as this is the value of RESEL_OFFSET, which is a parameter that determines how much greater the difference between the rssi of a candidate DCCH, and the candidate's minimum acceptable rssi for camping($C\_RESEL_{current}$) must be than the difference between the rssi of the initial DCCH and the initial DCCH's minimum acceptable rssi for camping($C\_RESEL_{candidate}$), i.e., how great ($C\_RESEL_{current} - C\_RESEL_{candidate}$) must be, before a DCCH is eligible to be a candidate DCCH. Omitting these thresholds increases both measurement and algorithm processing time greatly. Also, the quick reselection process may be performed using a faster measurement process than is used in conventional periodic reselection. In the IS-136 embodiment, for example, the short term mobile assisted channel allocation (MACA) measurement (STM) process may be used. This process requires a minimum of four signal strength measurements for each DCCH with a minimum time of 20 ms. between consecutive measurements.

At step 402 it may also be determined if the initial DCCH meets camping requirements. This result may be used to choose how rigorously DCCHs are chosen from the neighbor cell list for inclusion in the quick reselection measurement process. For example, if the initial DCCH meets the camping criteria, an acceptable DCCH has already been found and a less time consuming process can be used to choose the candidate DCCHs to be included in the quick reselection measurements then the process used to choose the candidate DCCHs for inclusion in the process if the initial DCCH does not meet camping criteria.

In this example, after the scanning of step 402 is completed, the process move to step 404 where it is determined if second DCCH having a stronger rssi at mobile station 20, more preferred for camping on by mobile station 20 then the initial DCCH, was found in step 402. If it is determined at step 404 that a more preferred second DCCH was not found in step 402 the process moves to step 406 where it is determined if the initial DCCH meets camping criteria. This may be determined by checking the results of the determination as to whether the initial DCCH meets the camping criteria, if the determination has already been made in step 402. If the initial DCCH meets camping criteria the process moves to step 312 where mobile station 20 camps on the initial DCCH. If the initial DCCH does not meet the camping criteria the process moves to step 314 of FIG. 3. If it is determined at step 404 that a more preferred second DCCH was found at step 402, the process moves to step 408. At step 408 mobile station 408 attempts to synchronize to the second DCCH. Next, at step 418, it is determined whether or not synchronization was achieved. If it is determined that synchronization was achieved, the process moves to step 418 where it is determined if the second DCCH meets camping criteria. If the second DCCH meets the camping criteria, the process moves to step 312 of FIG. 3 and the mobile station 20 then camps on the second DCCH. If, however, at step 410 it is determined that synchronization has not been achieved on the second DCCH the process moves from step 410 to step 412. Similarly, at step 418, if it is determined that the second DCCH does not meet camping criteria the process moves from step 418 to step 412. At step 412 mobile station 20 attempts to resynchronize to the initial DCCH. Next, at step 414, a determination is made as to whether resynchronization was achieved. If, at step 412, it is determined that resynchronization was not achieved the process moves to step 314 of FIG. 3. However, if it is determined that resynchronization was achieved the process moves to step 416. At step 416 a determination is made as to whether the initial DCCH meets camping criteria. This may be determined by checking the results of the determination as to whether the initial DCCH meets the camping criteria, if the determination has already been made in step 402. If, at step 416, it is determined that the camping criteria are met the process move to step 312 of FIG. 3 and mobile station 20 then camps on the initial DCCH. However, if it is determined that the camping criteria are not met mobile station 20 moves to step 314 of FIG. 3.

Referring again to FIG. 3, and if an acceptable DCCH is not found in steps 300–310, the process moves from either step 304 or step 306 to step 314. At step 314 mobile station 20 performs a scan of system ACCHs. At step 314 the mobile station locates the ACCH having the strongest rssi at, and attempts to synchronize to the located ACCH. If mobile station 20 cannot synchronize to the strongest ACCH it then attempts to synchronize to the second strongest ACCH. Next, at step 316, a determination is made as to whether mobile station 20 achieved synchronization to the ACCH having the first or second strongest rssi (at mobile station 20). If it is determined that no ACCH was found or that no synchronization was achieved, the process moves to step 322. At step 322 mobile station 20 performs a scan of the system frequency band in which DCCHs can be located, searching for a DCCH that meets signal strength and system selection criteria. Next, at step 324 it is determined if a DCCH was located in the band scan. If a DCCH was located in the band scan the process moves to step 330 where mobile station 20 camps on the DCCH. No quick reselection is performed before camping at step 330 because all frequencies have been scanned and the DCCH having the strongest rssi has already been located. If, however, at step 324 it is determined that the band scan was not successful, the process moves to step 326. At step 326 mobile station 20 determines if it can synchronize to a digital traffic channel (DTC) carrying digital locator information (DL) on DCCHs. If a DTC can be synchronized to the process moves to step 328 where mobile station 20 searches the DCCHs identified in the DL information for a DCCH that meets rssi signal strength and system selection requirements. If it is determined, at step 326, that a DTC having DL information cannot be synchronized to, the process moves to step 302. If it is determined, at step 328, that a DCCH cannot be found from the CDL information, the process moves to step 314.

If, however, it is determined at step 316 that synchronization was achieved on an ACCH, the process moves to step 318. At step 318 it is determined if the ACCH carries a pointer to a DCCH (info DCCH). If the ACCH does not carry a pointer the process moves to step 320 where mobile station 20 registers on the ACCH. If the ACCH carries a pointer the process moves to step 330 where the rssi of the info DCCH is measured. If the rssi of the info DCCH does not meet the predetermined signal strength requirements for a DCCH the process moves to step 334. A block scan may now be done on the probability block that contains the info DCCH. As an alternative, the process may move from step 330 to 302 and begin the initial scan over again. At step 334 it is determined if this is the first block scan on this probability block. If it is not the first block scan on this probability block the process moves to step 336 and mobile station 20 moves into the idle state. If it is the first block scan the process moves to step 340 where the block scan is performed on all frequencies in the probability block of the info DCCH. Next, at step 342 it is determined if a DCCH has been found in the probability block scan. If a DCCH was found that meets signal strength and system selection requirements, the process moves to step 344 and camps on the DCCH found in the probability block scan. If a DCCH was not found the process moves back to step 314 where an ACCH scan is begun again. If, however, at step 330 it is determined that the rssi of the info DCCH meets the predetermined minimum rssi requirements for a DCCH, the process moves to step 332. At step 332 mobile station 20 attempts to synchronize to the info DCCH. If synchronization is not achieved at step 322 the process moves to step 338, where it is determined if a block scan has already been done on the probability block of the info DCCH. If a block scan has previously been done the process moves to step 314. If, however, a block scan has not previously been done the process moves to step 340 and performs a block scan as was previously described for steps 340,342 and 344. If, however, synchronization is achieved at step 332 the process then moves to step 308.

At step 308 the quick reselection process(QRS) is performed to determined if a second DCCH, more preferred for mobile station 20, is included in the neighbor cell list read from the info DCCH or if the info DCCH is more preferred than the DCCHs in its neighbor cell list. Next, at step 310, it is determined if the quick reselection process has found a second DCCH or if it is determined that the info DCCH is acceptable for camping upon finding no second DCCH. If, in step 308, a second DCCH is found or, if it is determined that the info DCCH is to be used, the process moves to step 312 where the mobile station 20 camps on the chosen DCCH. If, however, a second DCCH is not found and if the info DCCH is found not to be acceptable for camping in step 308, the process moves to step 314. The quick reselection process for the info DCCH is performed as shown in FIG. 4, as was described when a initial DCCH is found in an initial scan. From step 308 the process continues as previously described.

Once mobile station 20 camps on a DCCH or registers on an ACCH, the mobile station may become involved in a call on a digital traffic channel (DTC) or an analog voice channel (AVCH). Upon the call ending, a call release will occur from the DTC or AVCH, and mobile station 20 will again select a control channel. The process of control channel selection upon call release can be described with reference to FIG. 5.

Referring now to FIG. 5, therein is a flow diagram illustrating control channel selection process steps performed within a mobile station upon call release according to an embodiment of the invention. The process begins at step 500 upon call release. Next, at step 502 it is determined whether or not DCCH information was received from the voice channel. The DCCH information may be received in a release message received on a DTC or in the release message received on a AVCH. If DCCH information was not received the process will move to step 314 of FIG. 3, and continue from step 314 as was previously describe for FIG. 3. If, however, DCCH information was received in the release message the process moves to step 506. At step 506 a determination is made as to whether the strongest rssi of the DCCH (info DCCH), having the strongest rssi of those DCCHs identified by the DCCH information, meets system selection signal strength requirements. If, at step 506, it is determined that the signal strength requirements are not met the process moves to step 302 of FIG. 3 and begins an initial scan for control channel selection. If, however, it is determined that the signal strength requirements are met, the process moves to step 508. At step 508 mobile station 20 attempts to synchronize onto the info DCCH. If synchronization is not achieved at step 508 the process moves to step 302 of FIG. 3 and begins an initial scan for control channel selection. If synchronization is achieved at step 508 the process move to step 510 where, in accordance with this invention, a quick reselection is performed.

At step 510 the quick reselection process (QRS) is performed to determined if a second DCCH, more preferred for mobile station 20, is included in the neighbor cell list read from the info DCCH, or if the info DCCH is more preferred than the DCCHs in its neighbor cell list. Next, at step 512, it is determined if the quick reselection process has found a second DCCH or if it is determined that the info DCCH is acceptable for camping upon finding no second DCCH. If, in step 510, a second DCCH is found, or if it is determined that the info DCCH is to be used, the process moves to step 514 where mobile station 20 camps on the chosen DCCH. If, however, a second DCCH is not found and the info DCCH is found not to be acceptable for camping in step 510, the process moves to step 302. The quick reselection process for the info DCCH is performed as shown in FIG. 4, as was previously described when an initial DCCH is found in an initial scan, with steps 308, 310, and 312 replaced with steps 510, 512, and 514, respectively.

The teaching of this invention should not be construed to be limited for use with only one communications standard or specification such as IS-136. Neither should it be construed to be limited to any particular configuration, such as the dual mode configuration of IS-136.

While the invention has been particularly shown and described with respect to preferred embodiments thereof, it will be understood by those skilled in the art that changes in form and details may be made therein without departing from the scope and spirit of the invention.

What is claimed is:

1. A method for selecting a digital control channel (DCCH) for a mobile station operating in a cellular system, said method comprising the steps of:

determining a first digital control channel (DCCH) from a set of control channels, wherein said first DCCH meets at least one predetermined system DCCH selection requirement;

reading, in response to determining said first DCCH, a neighbor cell list from said first DCCH, wherein said neighbor cell list identifies at least one other DCCH;

determining whether a second DCCH that is more preferred for selection by the mobile station than said first DCCH is included in said neighbor cell list; and, if it is so determined, camping on said second DCCH without beforehand camping on said first DCCH; else if it is determined that a second DCCH more preferred for selection by the mobile station than said first DCCH is not included in said neighbor cell list;

camping on said first DCCH.

2. The method of claim 1, wherein said step of determining a first DCCH comprises determining a first digital control channel (DCCH) from a set of control channels included in a last used DCCH list stored in the mobile station.

3. The method of claim 1, wherein said step of determining a first DCCH comprises determining a first digital control channel (DCCH) from DCCH information received over an analog control channel (ACCH).

4. The method of claim 1, wherein said step of determining a first DCCH comprises determining a first digital control channel (DCCH) from DCCH information received over a communications channel upon termination of a call between the mobile station and the cellular system.

5. The method of claim 1, wherein said step of determining a first DCCH comprises determining whether said first DCCH has a received signal strength (rssi) at the mobile station that meets a predetermined system DCCH selection requirement, and wherein said step of determining a second DCCH comprises determining whether a DCCH having a rssi at the mobile station that is a predetermined level above the rssi of said first DCCH is included in said neighbor cell list.

6. The method of claim 5, wherein said step of determining a first DCCH comprises determining a first digital control channel (DCCH) from a set of control channels included in a last used DCCH list stored in the mobile station.

7. The method of claim 5, wherein said step of determining a first DCCH comprises determining a first digital control channel (DCCH) from DCCH information received over an analog control channel(ACCH).

8. The method of claim 5, wherein said step of determining a first DCCH comprises determining a first digital control channel (DCCH) from DCCH information received over a communications channel upon termination of a call between the mobile station and the cellular system.

9. The method of claim 1, wherein said step of determining a second DCCH comprises the steps of:

selecting a plurality of selected DCCHs from said neighbor cell list; measuring a rssi for each of said plurality of selected DCCHs; and determining whether a DCCH having a rssi at the mobile station that is a predetermined level above the rssi of said first DCCH is included in said neighbor cell list.

10. An apparatus for selecting a digital control channel (DCCH) for a mobile station operating in a cellular system, said apparatus comprising:

means for determining a first digital control channel (DCCH) from a set of control channels, wherein said first DCCH meets at least one predetermined system DCCH selection requirement;

means for reading, in response to a determination made by said means for determining said first DCCH, a neighbor cell list from said first DCCH, wherein said neighbor cell list identifies a plurality of other DCCHs;

means for determining whether a second DCCH more preferred for selection by the mobile station than said first DCCH is included in said plurality of other DCCHs; means for camping on said second DCCH in response to a positive determination in said means for determining, without beforehand camping on said first DCCH; and means for camping on said first DCCH in response to a negative determination in said means for determining.

11. The apparatus of claim 10, wherein said means for determining a first DCCH comprises means for determining a first digital control channel(DCCH) from a set of control channels included in a last used DCCH list stored in the mobile station.

12. The apparatus of claim 10, wherein said means for determining a first DCCH comprises means for determining a first digital control channel(DCCH) from DCCH information received over an analog control channel(ACCH).

13. The apparatus of claim 10, wherein said means for determining a first DCCH comprises means for determining a first digital control channel (DCCH) from DCCH information received over a communications channel upon termination of a call between the mobile station and the cellular system.

14. The apparatus of claim 10, wherein said means for determining a first DCCH comprises means for determining whether said first DCCH has an received signal strength (rssi) at the mobile station that meets a predetermined system DCCH selection requirement, and, wherein said means for determining a second DCCH comprises means for determining whether a DCCH having a rssi at the mobile station that is a predetermined level above the rssi of said first DCCH is included in said plurality of other DCCHs.

15. The apparatus of claim 14, wherein said means for determining a first DCCH comprises:

means for determining a first digital control channel (DCCH) from a set of control channels included in a last used DCCH list stored in the mobile station.

16. The apparatus of claim 14, wherein said means for determining a first DCCH comprises:

means for determining a first digital control channel (DCCH) from DCCH information received over an analog control channel(ACCH).

17. The apparatus of claim 14, wherein said means determining a first DCCH comprises: means for determining a first digital control channel(DCCH) from DCCH information received over a communications channel upon termination of a call between the mobile station and the cellular system.

18. The apparatus of claim 10, wherein said means for determining a second DCCH comprises:

means for selecting a plurality of selected DCCHs from said plurality of other DCCHs;

means for measuring a rssi for each of said plurality of selected DCCHs; and means for determining whether a DCCH having a rssi at the mobile station a predetermined level above the rssi of said first DCCH is included in said plurality of selected DCCHs.

* * * * *